US012752657B2

(12) United States Patent
Mathews et al.

(10) Patent No.: US 12,752,657 B2
(45) Date of Patent: Oct. 6, 2026

(54) METHOD AND APPARATUS FOR DETERMINING ELECTRIC VEHICLE CHARGING INLET TERMINAL TEMPERATURE

(71) Applicant: Aptiv Technologies Limited, St. Michael (BB)

(72) Inventors: Thomas Mathews, Cortland, OH (US); Michael Phifer, Warren, OH (US)

(73) Assignee: Aptiv Technologies AG, Schaffhausen (CH)

( * ) Notice: Subject to any disclaimer, the term of this patent is extended or adjusted under 35 U.S.C. 154(b) by 823 days.

(21) Appl. No.: 18/121,665

(22) Filed: Mar. 15, 2023

(65) Prior Publication Data

US 2023/0302936 A1 Sep. 28, 2023

Related U.S. Application Data

(60) Provisional application No. 63/322,408, filed on Mar. 22, 2022.

(51) Int. Cl.
*B60L 53/60* (2019.01)
*B60L 53/16* (2019.01)
(Continued)

(52) U.S. Cl.
CPC ............... *B60L 53/60* (2019.02); *B60L 53/16* (2019.02); *G01K 3/005* (2013.01); *G01K 7/22* (2013.01); *H02J 7/975* (2026.01)

(58) Field of Classification Search
CPC ........... B60L 53/60; B60L 53/16; G01K 7/22; G01K 3/005; H02J 7/975
(Continued)

(56) References Cited

U.S. PATENT DOCUMENTS

| | | | | |
|---|---|---|---|---|
| 2013/0241484 A1 | 9/2013 | Marzo et al. | | |
| 2016/0041112 A1* | 2/2016 | Pan | ........................ | G01N 25/18 702/136 |

(Continued)

FOREIGN PATENT DOCUMENTS

| | | | | |
|---|---|---|---|---|
| EP | 3644456 B1 | 7/2021 | | |
| EP | 4063812 A1 | 9/2022 | | |
| GB | 2346745 A * | 8/2000 | ........ | H02J 7/007194 |

OTHER PUBLICATIONS

"Extended European Search Report" European Patent Office, mailed on Aug. 22, 2023, 9 Pages.

*Primary Examiner* — Julian D Huffman
*Assistant Examiner* — Nathan J Instone
(74) *Attorney, Agent, or Firm* — Billion & Armitage

(57) ABSTRACT

An electric vehicle charging system includes a temperature sensor for measuring the temperature of an inlet terminal of an electric vehicle charging inlet and an electronic controller configured to obtain an initial temperature value of the temperature sensor, obtain a current temperature value of the temperature sensor, calculate the inlet terminal temperature based on the initial temperature value, the current temperature value, a predetermined temperature sensor normalization factor, and a predetermined terminal normalization factor for the time after application of electrical power to the inlet terminal, and regulate the application of electrical power to the inlet terminal to maintain the inlet terminal temperature below a predetermined temperature threshold based on the calculated inlet terminal temperature. A method and a computer readable medium containing program instructions for determining an inlet terminal temperature of an electric vehicle charging inlet are also disclosed.

11 Claims, 3 Drawing Sheets

(51) Int. Cl.
*G01K 3/00* (2006.01)
*G01K 7/22* (2006.01)
*H02J 7/90* (2026.01)

(58) Field of Classification Search
USPC .......................................................... 320/109
See application file for complete search history.

(56) References Cited

U.S. PATENT DOCUMENTS

2018/0283913 A1* 10/2018 Chen ...................... G01D 21/00
2020/0343675 A1* 10/2020 Wolf ..................... B60L 53/302

* cited by examiner

METHOD AND APPARATUS FOR DETERMINING ELECTRIC VEHICLE CHARGING INLET TERMINAL TEMPERATURE

CROSS-REFERENCE TO RELATED APPLICATION

This application claims benefit of priority to U.S. Provisional Patent Application No. 63/322,408 filed on Mar. 22, 2022, the entire disclosure of which is hereby incorporated by reference.

TECHNICAL FIELD

This disclosure is directed to a method and apparatus for determining charging inlet terminal temperature, e.g., for electric vehicles.

BACKGROUND

Vehicle charging inlets are used to connect an electric vehicle to an external electrical power source in order to recharge the batteries in the electric vehicle. The charging inlet may be configured to conduct alternating current (AC) direct current (DC) or a combination of the two. Vehicle charging inlets may use one or more thermal sensors, e.g., thermistors, to monitor the temperature of inlet electrical terminals. The thermal sensors are positioned in proximity to the inlet terminals that are being monitored and once the thermal sensors register a temperature equal to a fixed temperature threshold vehicle charging current is reduced or is shut off to prevent an overheating condition. For example, the fixed temperature threshold may be 90° C. Once the thermal sensors register this temperature vehicle charging current is automatically reduced or shut off. Existing methods of using thermal sensors for monitoring temperature of inlet terminals do not factor in the terminal/thermal sensors temperature transient response or offset/delay between the thermal sensor's measurement and the actual terminal temperatures. A primary disadvantage is that existing methods may not be able to detect or prevent potential thermal runaway events, if for example, a faulty charge coupler is used or if there is a high resistance connection due to the difference between the measured temperature and the actual terminal temperature because of transient response, delay, or offset.

BRIEF SUMMARY

According to one or more aspects of the present disclosure, a method for determining an inlet terminal temperature of an electric vehicle charging inlet using an electronic controller, includes the steps of obtaining an initial temperature value of a temperature sensor configured to measure the temperature of an inlet terminal of the electric vehicle charging inlet via the electronic controller prior to application of electrical power to the inlet terminal; obtaining a current temperature value of the temperature sensor via the electronic controller at a time after application of electrical power to the inlet terminal; calculating the inlet terminal temperature using the electronic controller based on the initial temperature value, the current temperature value, a predetermined temperature sensor normalization factor, and a predetermined terminal normalization factor stored in a memory device that is in electronic communication with the electronic controller for the time after application of electrical power to the inlet terminal; and regulating the application of electrical power to the inlet terminal using the electronic controller to maintain the inlet terminal temperature below a predetermined threshold based on the calculated inlet terminal temperature.

In some aspects of the method according to the previous paragraph, a time series of the temperature sensor normalization factors is previously derived based on experimental simultaneous measurements of the current temperature value from the temperature sensor and the inlet terminal temperature.

In some aspects of the method according to any one of the previous paragraphs, the inlet terminal temperature is calculated by the electronic controller using the formula:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor.

In some aspects of the method according to any one of the previous paragraphs, the temperature sensor is a negative temperature coefficient (NTC) thermistor. The method further includes the steps of: determining and recording the current temperature value of the NTC thermistor using the Steinhart-Hart equation while simultaneously recording a measured value of the inlet terminal temperature over a time period starting at an initial time ($t_0$) as electrical power is applied to the inlet terminal; determining a first temperature delta between the recorded temperature values of the NTC thermistor over the time period and the recorded temperature value of the NTC thermistor at the initial time ($t_0$) and determining a second temperature delta between the measured value of the inlet terminal temperature over the time period and the measured value of the inlet terminal temperature at the initial time ($t_0$); developing a RC model equation to fit the first and second temperature delta data by determining coefficients for a thermal resistance and a time constant for the NTC thermistor and the inlet terminal; selecting an appropriate time step increment for determining the first and second temperature delta data and for determining the coefficients for the thermal resistance and time constant for the NTC thermistor and the inlet terminal; calculating the temperature sensor normalization factor and the terminal normalization factor by dividing each of the first and second temperature delta datum by a steady state response value of the NTC thermistor; and recording the temperature sensor normalization factor and the terminal normalization factor for each time step increment.

In some aspects of the method according to any one of the previous paragraphs, the inlet terminal conducts an alternating current after the application of electrical power to the inlet terminal.

In some aspects of the method according to any one of the previous paragraphs, the inlet terminal conducts a direct current after the application of electrical power to the inlet terminal.

According to one or more aspects of the present disclosure, a computer readable medium contains program instructions for determining an inlet terminal temperature of an electric vehicle charging inlet. Execution of the program instructions by one or more processors of a computer system causes the one or more processors to carry out the steps of: obtaining an initial temperature value of a temperature sensor configured to measure the temperature of an inlet terminal of the electric vehicle charging inlet prior to application of electrical power to the inlet terminal; obtaining a current temperature value of the temperature sensor at a time after application of electrical power to the inlet terminal; calculating the inlet terminal temperature of an electric vehicle charging inlet based on the initial temperature value, the current temperature value, a predetermined temperature sensor normalization factor, and a predetermined terminal normalization factor for the time after application of electrical power to the inlet terminal, wherein the temperature sensor normalization factor is contained in the computer readable medium; and regulating the application of electrical power to the inlet terminal to maintain the inlet terminal temperature below a predetermined temperature threshold based on the calculated inlet terminal temperature.

In some aspects of the computer readable medium according to the previous paragraph, a time series of the predetermined temperature sensor normalization factors and the terminal normalization factors are contained in the computer readable medium.

In some aspects of the computer readable medium according to any one of the previous paragraphs, the program instructions, the predetermined temperature sensor normalization factors, the terminal normalization factors, and the predetermined temperature threshold are contained in a nonvolatile portion of the computer readable medium.

In some aspects of the computer readable medium according to any one of the previous paragraphs, the program instructions contain the following formula for calculating the inlet terminal temperature:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor.

According to one or more aspects of the present disclosure, an electric vehicle charging system includes a temperature sensor configured to measure the temperature of an inlet terminal of an electric vehicle charging inlet; and an electronic controller configured to: obtain an initial temperature value of the temperature sensor prior to application of electrical power to the inlet terminal, obtain a current temperature value of the temperature sensor at a time after application of electrical power to the inlet terminal, calculate the inlet terminal temperature of the inlet terminal based on the initial temperature value, the current temperature value, a predetermined temperature sensor normalization factor, and a predetermined terminal normalization factor for the time after application of electrical power to the inlet terminal, and regulate the application of electrical power to the inlet terminal to maintain the inlet terminal temperature below a predetermined temperature threshold based on the calculated inlet terminal temperature.

In some aspects of the electric vehicle charging system according to the previous paragraph, the inlet terminal temperature is calculated by the electronic controller using the formula:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor.

In some aspects of the electric vehicle charging system according to any one of the previous paragraphs, the inlet terminal conducts an alternating current after the application of electrical power to the inlet terminal.

In some aspects of the electric vehicle charging system according to any one of the previous paragraphs, the inlet terminal conducts a direct current after the application of electrical power to the inlet terminal.

BRIEF DESCRIPTION OF THE DRAWINGS

The present invention will now be described by way of example with reference to the accompanying drawings, in which.

DETAILED DESCRIPTION

This disclosure describes a method of determining the temperature of an inlet terminal based on a temperature sensor located near the inlet terminal. The determined inlet terminal temperature is used to regulate the electrical power that the charging inlet receives from an electric vehicle charger.

Figure 1:
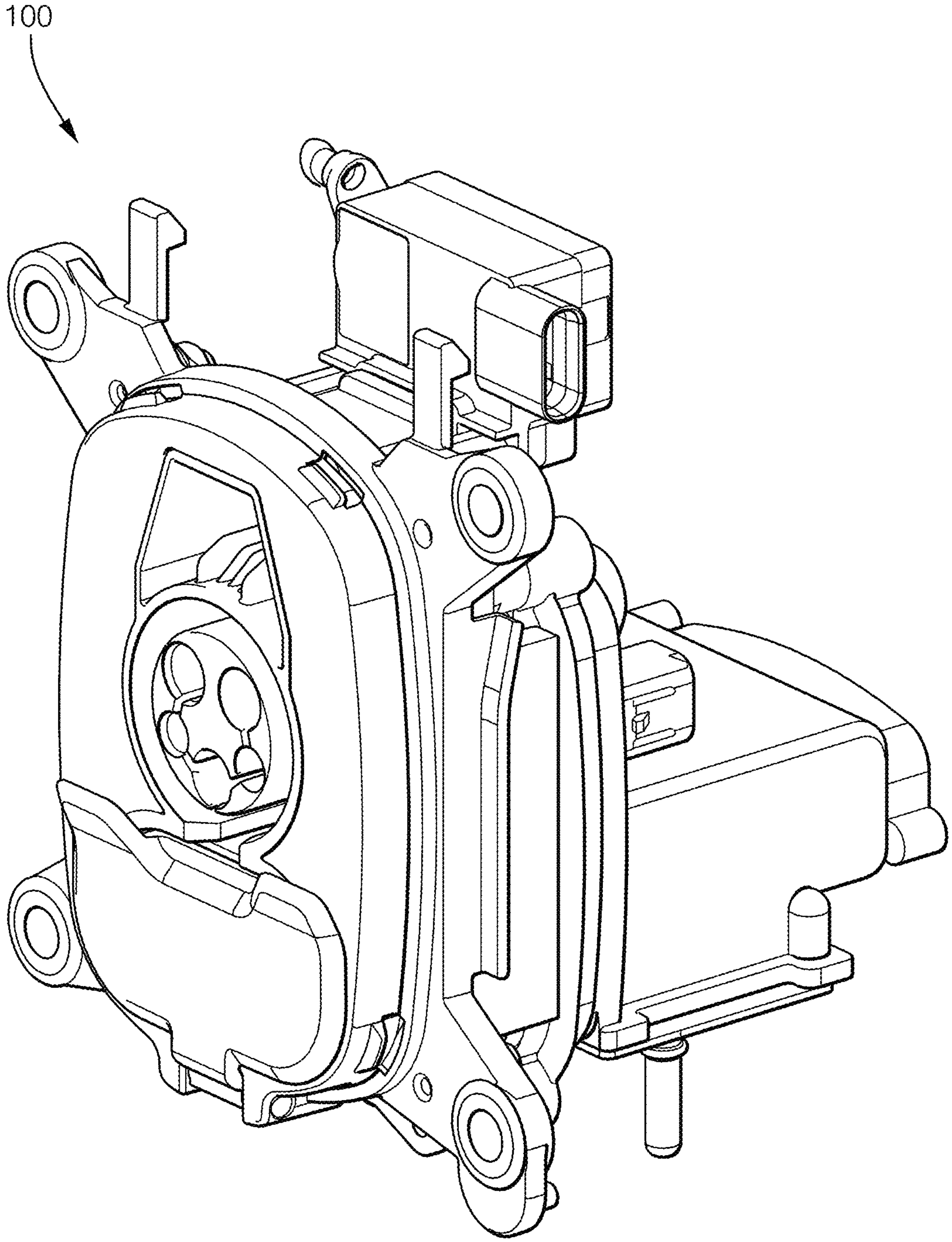
FIG. 1 illustrates an isometric view of a charging inlet according to some embodiments.
Figure 2:
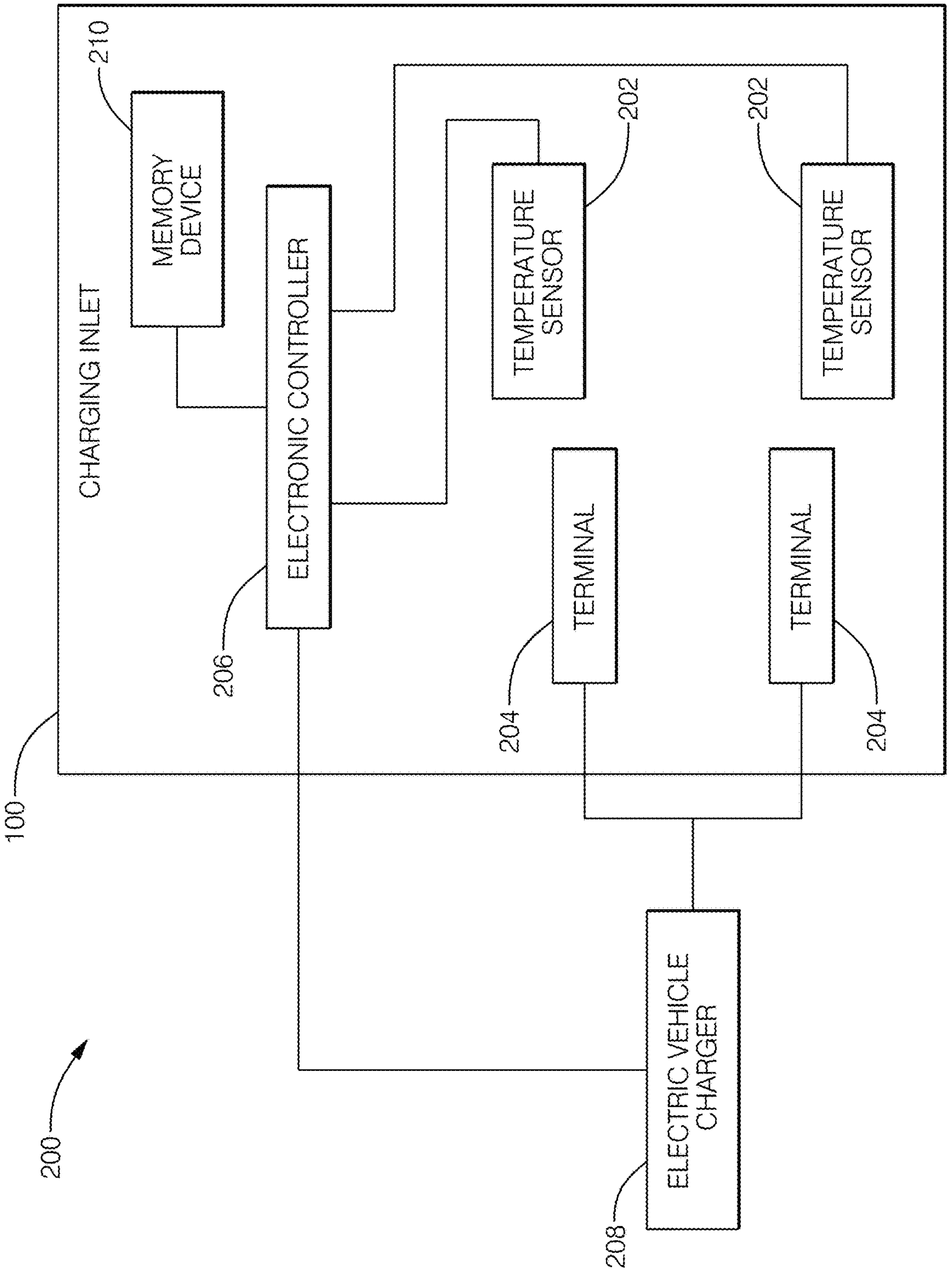
FIG. 2 illustrates schematic diagram of the charging inlet of FIG. 1 according to some embodiments.

A nonlimiting example of a charging inlet 100 is illustrated in FIG. 1 and a non-limiting example of an electric vehicle charging system 200 which includes the charging inlet 100 is illustrated in FIG. 2. The charging inlet 100 has one or more temperature sensors 202 that are configured to measure the temperature of one or more inlet terminals 204 of the charging inlet 100. The charging inlet 100 also includes an electronic controller 206 which is configured to:

- obtain an initial temperature value of the temperature sensor 202 prior to application of electrical power to the inlet terminal by an electric vehicle charger 208,
- obtain a current temperature value of the temperature sensors 202 at a time after application of electrical power to the inlet terminal by the electric vehicle charger 208,
- calculate the inlet terminal temperature of the inlet terminals 204 based on the initial temperature value, the current temperature value, a predetermined temperature sensor normalization factor, and a predetermined terminal normalization factor for the time after application of electrical power to the inlet terminal 204, and
- regulate the application of electrical power by the electric vehicle charger 208 to the inlet terminals 204 to maintain the inlet terminal temperature below a predetermined temperature threshold, e.g., 90° C., based on the calculated inlet terminal temperature. For example, the electronic controller 206 may command the electric vehicle charger 208 to reduce the electrical power supplied to the charging inlet 100 if the calculated inlet terminal temperature is approaching the predetermined temperature threshold. In another example, the electronic controller 206 may command the electric vehicle charger 208 to increase the electrical power supplied to the charging inlet 100 if the calculated inlet terminal temperature is significantly lower than the predetermined temperature threshold in order to reduce charging time.

Figure 3:
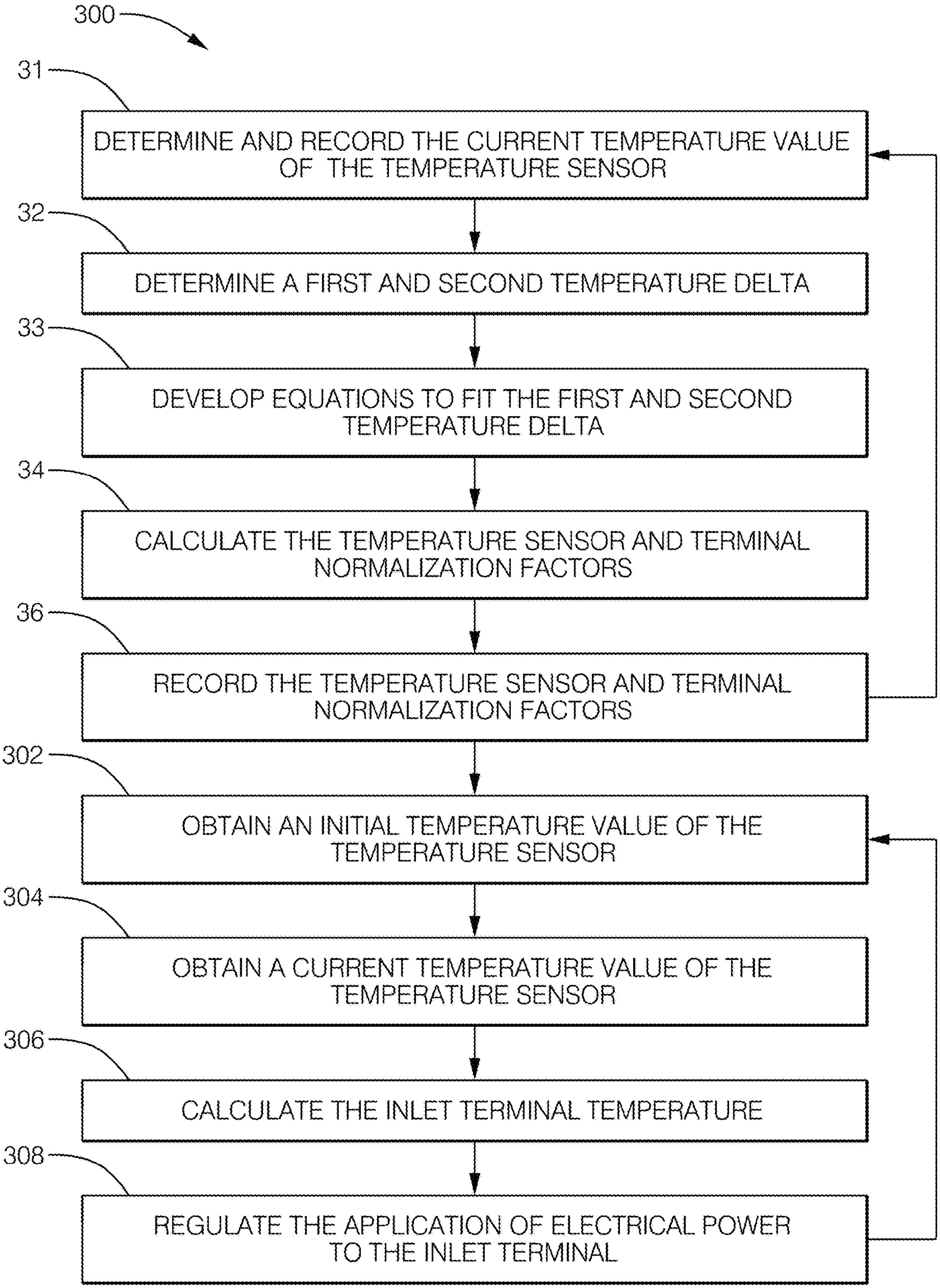
FIG. 3 illustrates an overview of a flow chart for a method of determining charging inlet terminal temperature according to some embodiments.

A non-limiting example of a method 300 of determining an inlet terminal temperature of an electric vehicle charging inlet that uses an electronic controller in conjunction with a temperature sensor is described herein. Typically, a negative temperature coefficient (NTC) thermistor is in electrical communication with the electronic controller. The method 300 accounts for factors such as ambient temperature and a time interval between temperature measurements. The method 300 illustrated in FIG. 3 includes at least the following steps:

STEP 302, OBTAIN AN INITIAL TEMPERATURE VALUE OF A TEMPERATURE SENSOR, includes obtaining an initial temperature value of a temperature sensor 202 configured to measure the temperature of an inlet terminal 204 of the electric vehicle charging inlet 100 that is located in proximity to the inlet terminal 204. The electronic controller 206 may obtain a resistance value from the temperature sensor 202 prior to application of electrical power to the inlet terminal 204 by the electric vehicle charger 208 and calculate the initial temperature value of the temperature sensor 202 based on that resistance value. The temperature sensor 202 may be a negative temperature coefficient (NTC) thermistor;

STEP 304, OBTAIN A CURRENT TEMPERATURE VALUE OF THE TEMPERATURE SENSOR, includes obtaining a current temperature value of the temperature sensor 202 via the electronic controller 206 at a time after application of electrical power to the inlet terminal 204 by the electric vehicle charger 208;

STEP 306, CALCULATE THE INLET TERMINAL TEMPERATURE, includes calculating the inlet terminal temperature using the electronic controller 206 based on the initial temperature value, the current temperature value, a predetermined temperature sensor normalization factor, and a predetermined terminal normalization factor stored in a memory device 210 that is in electronic communication with the electronic controller 206 for the time after application of electrical power to the inlet terminal 204 by the electric vehicle charger 208; and STEP 308, REGULATE THE APPLICATION OF ELECTRICAL POWER TO THE INLET TERMINAL, includes regulating the application of electrical power to the inlet terminal 204 by the electric vehicle charger 208 using the electronic controller 206 to maintain the inlet terminal temperature below a predetermined threshold based on the calculated inlet terminal temperature.

The inlet terminal temperature may be calculated by the electronic controller 206 using the formula in Equation 1 below:

$$T_{terminal}(t) = T_{sensor}(t_0) + \left(\frac{T_{sensor}(t) - T_{sensor}(t_0)}{NF_{sensor}(t)}\right) * NF_{terminal}(t), \quad \text{Eq. 1}$$

wherein $T_{terminal}(t)$ is the inlet terminal temperature, $T_{sensor}(t_0)$ is the initial temperature value of the temperature sensor 202, i.e., ambient temperature, $T_{sensor}(t)$ is the current temperature value of the temperature sensor 202, $NF_{sensor}(t)$ is the temperature sensor normalization factor, and $NF_{terminal}(t)$ is the terminal normalization factor. Steps 302 through 308 may be repeated at a regular time interval for the entire time that the electric vehicle charger 208 is supplying electrical power to the charging inlet 100.

The time series of the temperature sensor normalization factors may be previously derived based on experimental simultaneous measurements of the current temperature value from the temperature sensor 202 and the inlet terminal temperature to derive the temperature sensor and terminal normalization factors. Therefore, the method may further include the following steps that are performed prior to STEP 302:

STEP 31, DETERMINE AND RECORD THE CURRENT TEMPERATURE VALUE OF THE TEMPERATURE SENSOR, includes determining the current temperature value of the temperature sensor 202 using the Steinhart-Hart equation in Equation 2 below the case where the temperature sensor 202 is a NTC thermistor. This determination is made over a time period starting at an initial time ($t_0$) as electrical power is applied to the inlet terminal 204, preferably consistently applying the electrical power at or near the maximum power rating of the charging inlet 100. STEP 31 also includes recording the current temperature value of the temperature sensor 202 over the time period starting at the initial time ($t_0$). A measured value of the inlet terminal temperature is recorded over the time period starting at the initial time ($t_0$) simultaneously with determining the current temperature value of the temperature sensor 202.

$$\frac{1}{T} = A_1 + B_2 \ln\left(\frac{R}{R_{25}}\right) + C_2 \ln^2\left(\frac{R}{R_{25}}\right) + D_1 \ln^3\left(\frac{R}{R_{25}}\right) \quad \text{Eq. 2}$$

where R is the current thermistor resistance, $R_{25}$ is the thermistor resistance at 25° C., and $A_1$, $B_2$, $C_2$, and $D_1$ are characteristics of the particular NTC thermistor;

STEP 32, DETERMINE A FIRST AND SECOND TEMPERATURE DELTA, includes determining a first temperature delta between the recorded temperature values of the NTC thermistor over the time period and the recorded temperature value of the temperature sensor 202 at the initial time ($t_0$) and determining a second temperature delta between the measured value of the inlet terminal temperature over the time period and the measured value of the inlet terminal temperature at the initial time ($t_0$);

STEP 33, DEVELOP EQUATIONS TO FIT THE FIRST AND SECOND TEMPERATURE DELTA DATA, includes developing equations, such as a Foster RC model equation (see Equation 3 below) or a Cauer RC model equation, to fit the first and second temperature delta data by determining coefficients for a thermal resistance and a time constant for the temperature sensor 202 and the inlet terminal 204.

$$RT(t) = R_1(t)\left(1 - e^{\left(\frac{-t}{\tau_1}\right)}\right) + R_2(t)\left(1 - e^{\left(\frac{-t}{\tau_2}\right)}\right) + R_3(t)\left(1 - e^{\left(\frac{-t}{\tau_3}\right)}\right) + R_4(t)\left(1 - e^{\left(\frac{-t}{\tau_4}\right)}\right); \quad \text{Eq. 3}$$

STEP 34, SELECT AN APPROPRIATE TIME STEP INCREMENT, includes selecting an appropriate time step increment for determining the first and second temperature delta data and for determining the coefficients for the thermal resistance and time constant for the temperature sensor 202 and the inlet terminal 204;

STEP 35, CALCULATE THE TEMPERATURE SENSOR AND TERMINAL NORMALIZATION FACTORS, includes calculating the temperature sensor normalization factor $NF_{sensor}(t)$ and the terminal normalization factor $NF_{terminal}(t)$ by dividing each of the first and second temperature delta datum by a steady state response value of the temperature sensor 202; and STEP 36, RECORD THE TEMPERATURE SENSOR AND TERMINAL NORMALIZATION FACTORS, includes recording the temperature sensor normalization factor $NF_{sensor}(t)$ and the terminal normalization factor $NF_{terminal}(t)$ for each time step increment. STEPS 31 through 36 are repeated for a time period, for example until the first temperature delta reaches a steady state.

The inlet terminal 204 may conduct an alternating current or a direct current after the application of electrical power to the inlet terminal 204.

The predicated AC and/or DC terminal temperature is then used as an input to the vehicle charging control strategy.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A method for determining an inlet terminal temperature of an electric vehicle charging inlet using an electronic controller, comprising:

obtaining an initial temperature value of a temperature sensor configured to measure the temperature of an inlet terminal of the electric vehicle charging inlet via the electronic controller prior to application of electrical power to the inlet terminal;

obtaining a current temperature value of the temperature sensor via the electronic controller at a time after application of electrical power to the inlet terminal;

calculating the inlet terminal temperature using the electronic controller based on the initial temperature value, the current temperature value, a predetermined temperature sensor normalization factor, and a predetermined terminal normalization factor stored in a memory device that is in electronic communication with the electronic controller for the time after application of electrical power to the inlet terminal, the inlet terminal temperature is calculated by the electronic controller using the formula:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor; and regulating the application of electrical power to the inlet terminal using the electronic controller to maintain the inlet terminal temperature below a predetermined threshold based on the calculated inlet terminal temperature.

2. The method according to claim 1, wherein a time series of the temperature sensor normalization factors is previously derived based on experimental simultaneous measurements of the current temperature value from the temperature sensor and the inlet terminal temperature.

3. The method according to claim 1, wherein the temperature sensor is a negative temperature coefficient (NTC) thermistor, wherein the method further comprises:

determining and recording the current temperature value of the NTC thermistor using the Steinhart-Hart equation while simultaneously recording a measured value of the inlet terminal temperature over a time period starting at an initial time (to) as electrical power is applied to the inlet terminal;

determining a first temperature delta between the recorded temperature values of the NTC thermistor over the time period and the recorded temperature value of the NTC thermistor at the initial time (to) and determining a second temperature delta between the measured value of the inlet terminal temperature over the time period and the measured value of the inlet terminal temperature at the initial time (to);

developing a RC model equation to fit the first and second temperature delta data by determining coefficients for a thermal resistance and a time constant for the NTC thermistor and the inlet terminal;

selecting an appropriate time step increment for determining the first and second temperature delta data and for determining the coefficients for the thermal resistance and time constant for the NTC thermistor and the inlet terminal;

calculating the temperature sensor normalization factor and the terminal normalization factor by dividing each of the first and second temperature delta datum by a steady state response value of the NTC thermistor; and recording the temperature sensor normalization factor and the terminal normalization factor for each time step increment.

4. The method according to claim 1, wherein the inlet terminal conducts an alternating current after the application of electrical power to the inlet terminal.

5. The method according to claim 1, wherein the inlet terminal conducts a direct current after the application of electrical power to the inlet terminal.

6. A computer readable medium containing program instructions for determining an inlet terminal temperature of an electric vehicle charging inlet, wherein execution of the program instructions by one or more processors of a computer system causes the one or more processors to carry out the steps of:

obtaining an initial temperature value of a temperature sensor configured to measure the temperature of an inlet terminal of the electric vehicle charging inlet prior to application of electrical power to the inlet terminal;

obtaining a current temperature value of the temperature sensor at a time after application of electrical power to the inlet terminal;

calculating the inlet terminal temperature of an electric vehicle charging inlet based on the initial temperature value, the current temperature value, a predetermined temperature sensor normalization factor, and a predetermined terminal normalization factor for the time after application of electrical power to the inlet terminal, wherein the temperature sensor normalization factor is contained in the computer readable medium, the program instructions contain the following formula for calculating the inlet terminal temperature:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor; and regulating the application of electrical power to the inlet terminal to maintain the inlet terminal temperature below a predetermined temperature threshold based on the calculated inlet terminal temperature.

7. The computer readable medium according to claim 6, wherein a time series of the predetermined temperature sensor normalization factors and the terminal normalization factors are contained in the computer readable medium.

8. The computer readable medium according to claim 7, wherein the program instructions, the predetermined temperature sensor normalization factors, the terminal normalization factors, and the predetermined temperature threshold are contained in a nonvolatile portion of the computer readable medium.

9. An electric vehicle charging system, comprising:

a temperature sensor configured to measure the temperature of an inlet terminal of an electric vehicle charging inlet; and an electronic controller configured to:

obtain an initial temperature value of the temperature sensor prior to application of electrical power to the inlet terminal, obtain a current temperature value of the temperature sensor at a time after application of electrical power to the inlet terminal, calculate the inlet terminal temperature of the inlet terminal based on the initial temperature value, the current temperature value, a predetermined temperature sensor normalization factor, and a predetermined terminal normalization factor for the time after application of electrical power to the inlet terminal, the inlet terminal temperature is calculated by the electronic controller using the formula:

$$T_{terminal}(t) = T_{sensor}(t_0) + \left(\frac{T_{sensor}(t) - T_{sensor}(t_0)}{NF_{sensor}(t)}\right) * NF_{terminal}(t),$$

wherein $T_{terminal}(t)$ is the inlet terminal temperature, $T_{sensor}(t_0)$ is the initial temperature value of the temperature sensor, $T_{sensor}(t)$ is the current temperature value of the temperature sensor, $NF_{sensor}(t)$ is the temperature sensor normalization factor, and $NF_{terminal}(t)$ is the terminal normalization factor; and regulate the application of electrical power to the inlet terminal to maintain the inlet terminal temperature below a predetermined temperature threshold based on the calculated inlet terminal temperature.

10. The electric vehicle charging system according to claim 9, wherein the inlet terminal conducts an alternating current after the application of electrical power to the inlet terminal.

11. The electric vehicle charging system according to claim 9, the inlet terminal conducts a direct current after the application of electrical power to the inlet terminal.

* * * * *